Sept. 12, 1950     J. E. DIGMAN     2,521,837
GROUND SWITCH FOR MOTOR VEHICLE BATTERIES
Filed Dec. 10, 1948
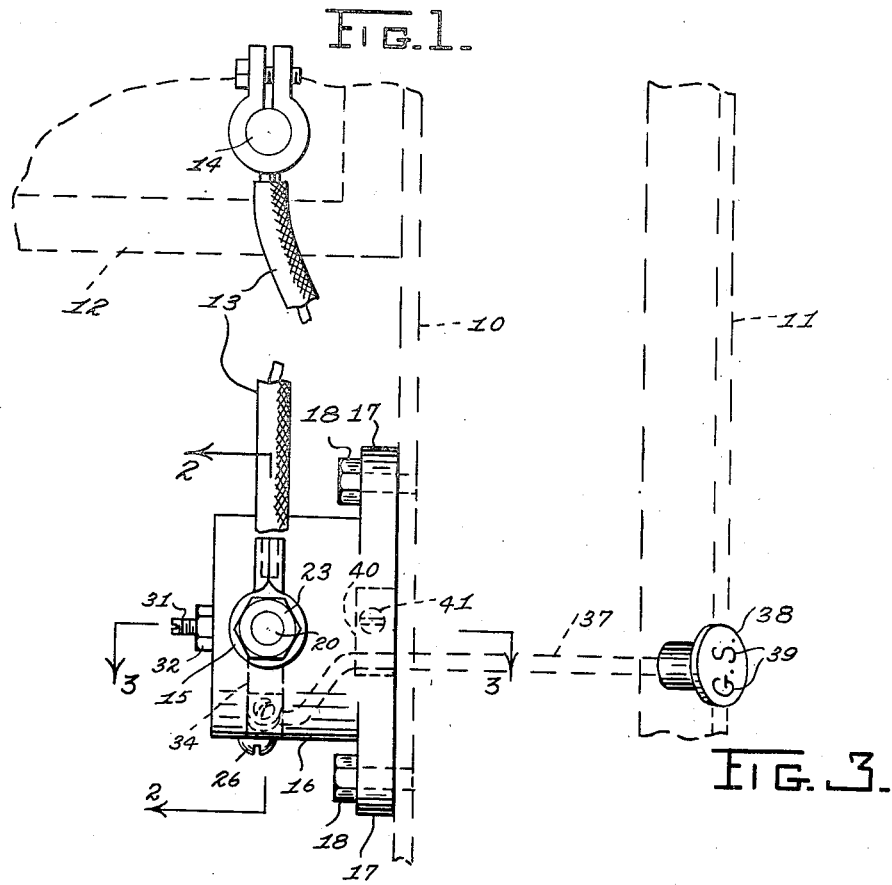
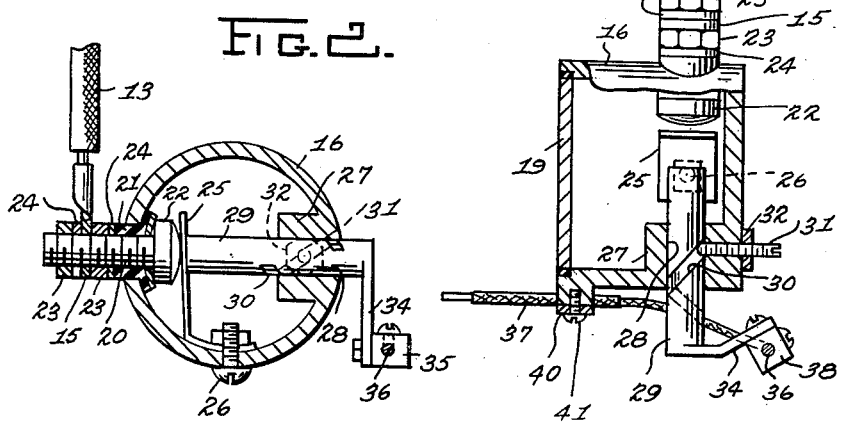
INVENTOR.
JOHN E. DIGMAN
BY
McMorrow, Berman + Davidson
ATTORNEYS Patented Sept. 12, 1950

2,521,837

UNITED STATES PATENT OFFICE 2,521,837

GROUND SWITCH FOR MOTOR VEHICLE BATTERIES

John E. Digman, Takoma Park, Md.

Application December 10, 1948, Serial No. 64,690

2 Claims. (Cl. 200—153)

My invention relates to a switch adapted to be interposed in the ground circuit of a motor vehicle battery whereby to open and close such circuit upon opening and closing of the switch. The switch according to the invention comprises an improvement over the copending application of myself and Carl S. Davis, filed November 7, 1947, Serial No. 784,610, now Patent No. 2,481,829, granted September 13, 1949.

With the foregoing in view, it is an object of my invention to provide an improved ground switch for motor vehicle batteries.

A further object is to provide an improved ground switch for motor vehicle batteries which includes a switch body mounted on a motor vehicle frame, a movable contact carried by the switch body, a stationary contact carried by the switch body and insulated therefrom, said stationary contact being adapted to be connected to the ground cable of a battery, a worm shaft threaded in said body and in operative engagement with said movable contact, and remote control means for pivoting said shaft whereby to advance and retract the same and thereby move said movable contact into and out of engagement with said stationary contact.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Figure 1 is a plan view of the switch according to the invention, showing the same in position on a motor vehicle frame, the motor vehicle frame being shown diagrammatically;

Figure 2 is a transverse vertical sectional view taken substantially on the plane of the line 2—2 of Figure 1;

Figure 3 is a longitudinal vertical sectional view taken substantially on the plane of the line 3—3 of Figure 1.

Referring specifically to the drawing, wherein like reference characters have been used throughout the several views to designate like parts, 10 designates generally any suitable metallic frame portion of a motor vehicle, such as a fire wall. The numeral 11 designates generally a remotely-located portion of the motor vehicle, such as the dashboard. A storage battery 12 for the motor vehicle is mounted in any suitable manner thereon and includes a ground cable 13 detachably secured to one pole 14 of the battery in any suitable and/or well known manner. The opposite end of the ground cable 13 is provided with the usual terminal 15 in the form of an eye which normally is detachably secured to any suitable stud or the like, not shown, mounted on the frame of the motor vehicle, whereby to ground the battery.

The switch according to the invention comprises a hollow cylindrical casing 16 providing a switch body which is preferably formed of current-conducting material. The body 16 is open at one end and thereat provided with a pair of oppositely-directed apertured ears 17 whereby the open end is adapted to be detachably connected by the set screws 18 to the fire wall 10 of the vehicle in current-conducting relation thereto. The open end of the casing 16 may be closed by a dust cap 19, Figure 3, which may be held in place by the engagement of the open end of the housing with the fire wall 10.

The stem 20 of a headed stud of current-conducting material extends radially through the side wall of the casing 16, but is insulated therefrom by the flanged collar 21 of insulating material which is concentrically disposed about the stem 20. The head 22 for the stud 20 is disposed inwardly of the casing 16 and provides a stationary contact for the switch. The eye 15 for the ground cable 13 is adapted to encircle the stem body of the stud and be rigidly secured thereto by the nuts 23 and washers 24 in a well known manner.

A movable contact 25 is located inside of the casing 16 and in the embodiment illustrated comprises a spring contact having its free end normally biased out of engagement with the stationary contact 22. The opposite end of the contact 25 is secured to the casing 16 in any suitable manner, as by the nut-and-bolt 26. The inner periphery of the wall of the casing 16 opposite to the head 22 of the stationary contact is formed with a radially inwardly-directed boss 27 which is provided with a cylindrical bore 28 in alignment with the stationary contact 22. A shaft 29 is slidable and rotatable in the bore 28. The shaft 29 is formed with a worm thread 30 of relatively long pitch whereby to provide means for advancing and retracting the shaft in the bore 28, as will appear later. Likewise, the casing 16 is provided with a pin 31 which intersects the bore 28 to provide an inner end for the pin slidably seatable in the thread 30. In the embodiment illustrated, the pin 31 comprises a set screw which may be locked in a suitable, adjusted position by any suitable means, such as the lock nut 32. In this connection, it should be noted that the pin 31 comprises means not only for causing advancing and retracting movement of the shaft 29 upon pivoting of the same in opposite directions, but also provides means for retaining the shaft in the bore 28 of the boss 27. The shaft 29 includes a free end projecting radially outwardly of the casing 16 and formed with an integral rocker arm 34. The free end of the rocker arm 34 is connected in any suitable manner, as by the means 35, to a push-pull link 36 which preferably is in the form of a flexible or semi-rigid cable. The link 36 is extended through any flexible conduit 37 to the dashboard 11 and the remote end thereof may be provided with a push-pull knob 38 suitably inscribed with identifying indicia 39. The conduit 37 is adapted to be clipped to the periphery of the casing 16 by any suitable clip 40 which may be secured by a set screw 41.

On account of the long pitch of the thread 30, it is necessary to pivot the shaft 29 only about 90° to cause the free inner end of the shaft which bears against the movable contact 25 to advance sufficiently to move the spring contact 25 into switch-closing engagement with the stationary contact 22. A reverse pivoting of the shaft 29 to a like degree will break the circuit, whereby the battery 12 is no longer grounded. Thus, it is a simple matter for the car driver prior to leaving the car for a more or less protracted period, to pull outwardly on the hand piece or knob 38, whereby the rocker arm 34 and shaft 29 are pivoted sufficiently to permit the spring contact 25 to disengage the stationary contact 22. This arrangement will break every circuit in the automobile and prevent any bleeding of the battery through undetected short circuits or the like. When the driver wishes to use the car, it is a simple matter to push the finger piece 38 back to its original position whereby to close the switch and ground the battery 12.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. A switch for the ground cable of a battery supported on the frame of a motor vehicle comprising a current-conductive closed-end hollow cylindrical member having one end positioned in current-conducting relation to said frame and fixedly secured to the latter, a first contact supported within the wall of said cylinder and insulated from the latter, said contact having one end projecting from the wall of said cylinder for connection to said ground cable, a second contact arranged in opposed aligned relation with respect to said first-named contact and mounted in the wall of said cylinder for rocking movement, resilient contact means carried by the wall of said cylinder and interposed between the facing ends of said first and second-named contacts, the other end of said second-named contact projecting from the wall of said cylinder, and remotely-operable means operatively connected to the projecting end of said second contact for effecting the rocking movement of the latter to thereby cause said second-named contact to abut one face of said resilient contact means and urge the other face into touching relation with the facing end of said first-named contact.

2. A switch for the ground cable of a battery supported on the frame of a motor vehicle comprising a current-conductive closed-end hollow cylindrical member having one end positioned in current-conducting relation to said frame and fixedly secured to the latter, the first contact supported within the wall of said cylinder and insulated from the latter, said contact having one end projecting from the wall of said cylinder for connection to said ground cable, the second contact arranged in opposed aligned relation with respect to said first-named contact and mounted in the wall of said cylinder for rocking movement, guide means carried in the wall of said cylinder and operatively engaging said second contact, said last-named means comprising a spiral groove formed longitudinally of said second contact, a pin having one end extending through the wall of said cylinder and mounted for sliding movement into and out of engagement with said spiral groove, and means carried by the other end of said pin for holding said pin in engagement with said spiral groove, resilient contacting means carried by the wall of said cylinder and interposed between the facing ends of said first and second-named contacts, the other end of said second-named contact projecting from the wall of said cylinder, and remotely-operable means operatively connected to the projecting end of said second contact for effecting the rocking movement of the latter to thereby cause said second-named contact to abut one face of said resilient contact means and urge the other face into touching relation with the facing end of said first-named contact.

JOHN E. DIGMAN.

REFERENCES CITED

The following references are of record in the file of this patent:

UNITED STATES PATENTS

| Number | Name | Date |
|---|---|---|
| 1,628,884 | Ile | May 17, 1927 |
| 1,995,946 | Schild | Mar. 26, 1935 |
| 2,277,671 | Williams et al. | Mar. 31, 1942 |